(12) United States Patent
Lee et al.

(10) Patent No.: US 8,552,082 B2
(45) Date of Patent: Oct. 8, 2013

(54) ALKALI-SOLUBLE POLYMER COMPOUND AND PHOTOSENSITIVE RESIN COMPOSITION USING THE SAME

(75) Inventors: Keon Woo Lee, Daejeon (KR); Sang Kyu Kwak, Daejeon (KR); Chang Soon Lee, Daejeon (KR); Hye Hyeon Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 71 days.

(21) Appl. No.: 13/096,522

(22) Filed: Apr. 28, 2011

(65) Prior Publication Data

US 2011/0269867 A1    Nov. 3, 2011

(30) Foreign Application Priority Data

Apr. 28, 2010  (KR) ........................ 10-2010-0039662

(51) Int. Cl.
  *C08F 2/50*    (2006.01)
  *H05B 6/68*    (2006.01)
  *B29C 71/04*   (2006.01)

(52) U.S. Cl.
  USPC ........................ 522/46; 522/6; 522/1; 522/71

(58) Field of Classification Search
  USPC ............................................. 522/46, 6, 1, 71
  See application file for complete search history.

(56) References Cited

U.S. PATENT DOCUMENTS 6,291,129 B1 * 9/2001 Shida et al. ................ 430/270.1

FOREIGN PATENT DOCUMENTS

| KR | 20010018075 A | 3/2001 | |
| KR | 2006-035380 | * | 4/2006 |

\* cited by examiner

*Primary Examiner* — Ling Choi
*Assistant Examiner* — Jessica E Whiteley
(74) *Attorney, Agent, or Firm* — Rothwell, Figg, Ernst & Manbeck, P.C.

(57) ABSTRACT

A novel alkali-soluble polymer compound including a dehydrogenated pimaric acid and/or its isomer as a repeating unit, and a photosensitive resin composition including the alkali-soluble polymer compound as an effective binder matrix are provided. A photosensitive resin composition using the alkali-soluble polymer compound including a dehydrogenated resin acid has excellent photosensitivity and developing characteristics cause a less deformation in a firing process, has excellent elasticity. Thus, the photosensitive resin composition is advantageous for curing various transparent photosensitive materials, in particular, materials of column spacers, an overcoat, a passivation layer, or the like, used for fabricating color filters of an LCD.

14 Claims, No Drawings

ALKALI-SOLUBLE POLYMER COMPOUND AND PHOTOSENSITIVE RESIN COMPOSITION USING THE SAME

CROSS-REFERENCE TO RELATED APPLICATIONS

"This application claims the benefit of Korean Patent Application No. 10-2010-0039662 filed on Apr. 28, 2010 and entitled "ALKALI-SOLUBLE POLYMER COMPOUND AND PHOTOSENSITIVE RESIN COMPOSITION USING THE SAME" which is hereby incorporated by reference in its entirety into this application"

BACKGROUND OF THE INVENTION

1. Field of the Invention

The present invention relates to an alkali-soluble polymer compound containing dehydrogenated resin acid as a monomer component in its single molecule; and a transparent photosensitive resin composition containing the alkali-soluble polymer compound as an effective binder matrix material, which is capable of (1) quickly photo-curing a transparent thin film used in a liquid crystal display, in the form of pattern or entire coating, (2) preventing generation of scum during development, and (3) causing a fewer change in the pattern during a firing process, thereby forming a pattern almost having a vertical shape.

2. Description of the Related Art

A photosensitive resin composition is applied to a substrate to form a film, and the entire film is exposed to form an insulating layer or a protective layer. The photosensitive resin composition is also used to produce a pattern by exposing a particular portion of the film to light irradiation using a photomask or the like, and by removing a non-exposed portion through development.

Since the photosensitive resin composition can be polymerized and cured by irradiating light, it is used for photo-curable ink, a photosensitive printing plate, various photoresists, a color filter photoresist for a liquid crystal display (LCD), a photoresist for a resin black matrix, a transparent photosensitive material, and the like.

Among them, a transparent photosensitive resin composition, which covers a column spacer, an overcoat, a passivation film, refers to a composition in a liquid state comprising an alkali-soluble resin, a polymerizable compound having ethylenically unsaturated bonds, a photopolymerization initiator, and a solvent. This composition usually does not use a coloring agent such as a pigment.

As the use of LCDs is becoming upgraded and diversified, LCDs are manufactured to be used for TVs, monitors, or the like, as well as for the conventional notebook computers, mobile devices, or the like. Demand for a material that quickly reacts to light and has mechanically excellent physical properties has been increasing to improve productivity and durability of LCDs. In forming a pattern through a photolithography or an insulated protective film through full surface exposure, the quality of quickly reacting to light, namely, photosensitivity, is very important. Also, in forming a pattern, a portion not reacted to light needs to be cleansed to prevent a liquid crystal layer from being contaminated or prevent a problem in a subsequent process. In addition, in order to allow LCDs to exhibit the original performance without being damaged by an external impact, mechanical physical properties of the column spacer patterns serving as a support must be excellent. These requirements can be met by increasing an upper area of the patterns.

The alkali-soluble resin is a dominant component that functions as a binder matrix in the photosensitive resin composition. The structure of the alkali-soluble resin must be optimized such that a portion, of the alkali-soluble resin, not reacted to light can be quickly cleansed by an alkaline solution, the alkali-soluble resin can quickly react to light, and a change of the alkali-soluble resin during a firing process in which heat is applied can be minimized. It is particularly important in forming a column spacer on an overcoat thin film that a portion of the alkali-soluble resin not reacted to light needs to be completely removed by an alkaline solution. Since the overcoat is an organic thin film generally formed by crosslinking a resin composition by light or heat, polymer in a column spacer has higher affinity with a crosslinking agent, compared with indium-tin oxide (ITO), an inorganic thin film. Thus, a column spacer resin composition not reacted to light may not be completely cleansed by an alkaline solution but remain in the form of small grains on the overcoat. When a liquid crystal alignment is induced by performing a rubbing or mechanical rubbing process on an alignment film, the remaining grains may be detected as debris to cause a scratch. Also, when crosslinking reaction is quickly done owing to good light reactivity, the crosslinked polymer has a structure with high density, reducing a contaminant source of liquid crystal, a residual film ratio of patterns is increased and other raw materials can be widely used in preparing the composition. The reduction in deformation caused by heat in the firing process is closely connected with apparent strength of the patterns. In the column spacers, before and after the firing process, generally, upper portions thereof undergo deformation, as well as a reduction in the thickness thereof. When such deformation is great, the area of the portions of the column spacers supporting a TFT substrate is reduced and resistance of a panel against an external force is weakened. Thus, maintaining a large supporting area by reducing deformation during the firing process is directly related to maintaining the mechanical physical properties of the column spacers.

In order to obtain such characteristics, there is a need to optimize the structure by using various functional monomers through polymerization in making an alkali-soluble resin, and a method for copolymerization by using an appropriate amount of monomers that are excellent in such characteristics is desirable. The desired effect can be obtained by adjusting a molecular weight and an acid value of the polymers thus obtained, without using an additive.

Transparent photosensitive resin compositions known up to date use polymers obtained by adding various functional monomers to a copolymer of methyl methacrylic acid containing carboxylic acid allowing for cleansing in alkali and benzyl methacrylate providing an adhesive property to a pattern. For example, Korean Laid Open Publication No. 2001-0018075 discloses a method for strengthening chemical bonds of a portion crosslinked by light by adding a self-curable structure to the conventional polymer to improve the difference in solubility, thus increasing resolving power and reducing the amount of a crosslinkable compound. However, with this method, the cleansing characteristics of the portion not exposed to light cannot be improved, so the liquid crystal contamination and the problems which may arise in the rubbing process in the liquid crystal alignment are not resolved. In order to minimize such shortcomings, an additive containing an organic acid such as a citric acid, or the like, may be used, but its use is limited because such an additive is generally costly, has low solubility, and is likely to be a contaminant source of liquid crystal.

Thus, development of a polymer which is capable of providing a desired effect and minimizing the accompanying shortcomings is required.

SUMMARY OF THE INVENTION

Therefore, the present invention is to solve the foregoing problems in the prior art. More particularly, in forming a pattern by using a photosensitive resin composition comprising an alkali-soluble polymer, the pattern is generally subjected to exposing, developing, and firing processes, and change in thickness of the patterns and deformation of upper films are observed after the firing process. Thus, one embodiment of the present invention is to provide an alkali-soluble polymer having structural characteristics for minimizing a thermal deformation in the sequential processes, in particular, in the firing process, and a photosensitive resin composition comprising the alkali-soluble polymer as a binder matrix component.

Another embodiment of the present invention provides a novel alkali-soluble polymer compound comprising as a monomer a dehydrogenated resin acid having a particular structure.

Still another embodiment of the present invention provides a photosensitive resin composition comprising the novel polymer compound as a binder matrix material.

Another embodiment of the present invention provides a transparent thin film layer fabricated by using the transparent photosensitive resin composition.

Another embodiment of the present invention provides a liquid crystal display comprising the transparent thin film layer.

The inventors of the present application have fabricated an alkali-soluble polymer compound by copolymerizing monomers having a dehydrogenated resin acid in a single molecule, specifically, a dehydrogenated pimaric acid and/or its isomer, and fabricated a photosensitive resin composition by using the alkali-soluble polymer compound as a binder matrix material.

The dehydrogenated pimaric acid and/or its isomer have the following characteristics: 1) since they have a double bond in their structure, a photopolymerization reaction can quickly take place due to the double bond when they are exposed to ultraviolet rays; 2) entanglement of chains of polymer can be prevented owing to its bulky structure having aromatic rings, which enables removing an impediment to the photopolymerization reaction and improving alkali development characteristics; and 3) a movement of chains of the polymer can be prevented during the firing process at a high temperature to form a pattern which is less susceptible to deformation by heat.

The use of the alkali-soluble polymer compound prepared by using the dehydrogenated pimaric acid and/or its isomer according to an exemplary embodiment of the present invention as a binder matrix material enables increasing the reactivity of the photosensitive resin composition to light, i.e., photosensitivity, improving the alkali cleansing characteristics of a portion not crosslinked by light, reducing deformation caused by heat, ensuring excellent elasticity to provide advantages for curing the materials for column spacers, an overcoat, and a passivation film in a liquid crystal display (LCD), and to reduce a defective rate in the manufacturing process.

DETAILED DESCRIPTION OF THE INVENTION

According to one embodiment of the present invention, there is provided an alkali-soluble polymer compound including a dehydrogenated pimaric acid and/or its isomer represented by any one of Chemical Formulas 1 to 3 shown below:

[Chemical Formula 1]

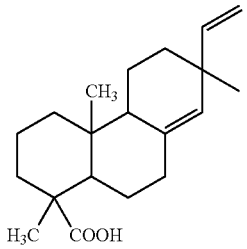

[Chemial Formula 2]

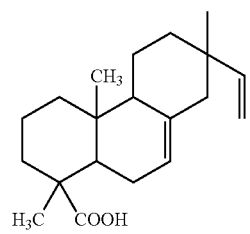

[Chemical Formula 3]

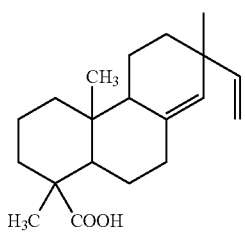

According to another embodiment of the present invention, there is also provided a photosensitive resin composition comprising: 2 to 20 parts by weight of an alkali-soluble polymer compound including a dehydrogenated pimaric acid and/or its isomer represented by any one of Chemical Formulas 1 to 3 shown above; 0.5 to 20 parts by weight of a polymerizable compound having ethylenically unsaturated bonds; 0.1 to 20 parts by weight of a optically active radical initiator; and 10 to 95 parts by weight of a solvent.

In accordance with another embodiment of the present invention, there is also provided a transparent thin film layer using the photosensitive resin composition.

According to another embodiment of the present invention, there is also provided a liquid crystal display (LCD) device containing the transparent thin film layer.

Exemplary embodiments of the present invention will now be described in detail.

The present invention relates to an alkali-soluble polymer compound comprising a dehydrogenated pimaric acid and its isomer as a repeating unit and a photosensitive resin composition comprising the alkali-soluble polymer compound.

1. Alkali-Soluble Polymer Compound

The alkali-soluble polymer compound according to an exemplary embodiment of the present invention comprises a dehydrogenated pimaric acid and/or its isomer represented by any one of Chemical Formulas 1 to 3.

[Compound Formula 1]

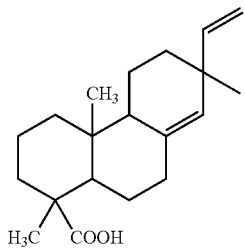

[Compound Formula 2]

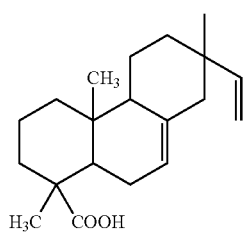

[Compound Formula 3]

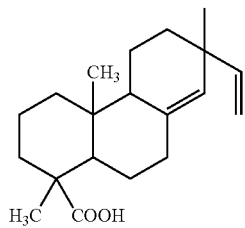

Preferably, the dehydrogenated pimaric acid and/or its isomer included in the alkali-soluble polymer compound according to an exemplary embodiment of the present invention is at least one selected from a pimaric acid represented by Chemical Formula 1, an isopimaric acid represented by Chemical Formula 2, and a sandaracopimaric acid represented by Chemical Formula 3.

The dehydrogenated pimaric acid and/or its isomer include double bonds, are bulky, and include a carboxylic acid. Thus, the dehydrogenated pimaric acid and its isomer provide various advantages. Namely, when a photosensitive composition using a polymer compound fabricated by including the dehydrogenated pimaric acid or its isomer in a repeating unit of the alkali-soluble polymer compound is exposed to ultraviolet ray, a photopolymerization reaction quickly takes place due to the presence of double bonds. Also, the bulky characteristics of the dehydrogenated pimaric acid and its isomer can prevent entanglement of polymer chains, which impedes the photopolymerization reaction and reduces the cleansing capability of alkali of a portion not cross-linked by light, resulting in an enhancement of the sensitivity and the alkali cleansing characteristics. Also, such structural characteristics of the dehydrogenated pimaric acid and its isomer prevent a movement of the polymer chains to allow a formation of a pattern which is less susceptible to a deformation by heat.

The dehydrogenated pimaric acid and/or its isomer represented by any one of Chemical Formulas 1 to 3 is contained by 3 to 50 mol % of the alkali-soluble polymer compound, and preferably, by 10 to 30 mol %. If the content of the dehydrogenated pimaric acid and/or its isomer represented by any one of Chemical Formulas 1 to 3 is less than 3 mol %, the effects described in the present disclosure could be hardly obtained, and if the content of the dehydrogenated pimaric acid and its isomer exceeds 50 mol %, the cleansing characteristics would be excessively improved to cause the pattern to be detached.

Meanwhile, according to an exemplary embodiment of the present invention, the alkali-soluble polymer compound may be fabricated by copolymerizing a monomer including an acid functional group and a monomer which can be copolymerizable with the monomer including an acid functional group, in addition to the dehydrogenated pimaric acid and its isomer represented by any one of Chemical Formulas 1 to 3. A portion of the acid functional group may be selectively substituted by using an epoxy group and a monomer containing an ethylenically unsaturated compound.

The monomer including an acid functional group may include (meth)acrylic acid, crotonic acid, itaconic acid, maleic acid, fumaric acid, monomethyl maleic acid, isoprene sulfonic acid, styrene sulfonic acid, 5-norbornene-2-carboxylic acid, mono-2-((meth)acryloyloxy)ethyl phthalate, mono-2-((meth)acryloyloxy)ethyl succinate, ω-carboxy polycaprolactone mono(meth)acrylate, or a mixture thereof, but the present invention is not limited thereto.

The monomer which is polymerizable with the monomer including the acid functional group may include unsaturated carboxylic acid esters such as benzyl (meth)acrylate, methyl (meth)acrylate, ethyl(meth)acrylate, butyl(meth)acrylate, dimethylaminoethyl(meth)acrylate, isobutyl(meth)acrylate, t-butyl(meth)acrylate, cyclohexyl(meth)acrylate, isobonyl (meth)acrylate, ethylhexyl(meth)acrylate, 2-phenoxyethyl (meth)acrylate, tetrahydroperpril(meth)acrylate, hydroxyethyl(meth)acrylate, 2-hydroxypropyl(meth)acrylate, 2-hydroxy-3-chloropropyl(meth)acrylate, 4-hydroxybutyl (meth)acrylate, acyloctyloxy-2-hydroxypropyl(meth)acrylate, glycerol(meth)acrylate, 2-methoxyethyl(meth)acrylate, 3-methoxybutyl(meth)acrylate, ethoxydiehyleneglycol (meth)acrylate, ethoxytriethyleneglycol(meth)acrylate, methoxytriethyleneglycol(meth)acrylate, methoxytripropyleneglycol(meth)acrylate, poly(ethylene glycol)methylether (meth)acrylate, phenoxydiethyleneglycol(meth)acrylate, p-nonylphenoxypolyethyleneglycol(meth)acrylate, p-nonylphenoxypolypropyleneglycol(meth)acrylate, 1,1,1,3,3,3-hexqagluoroisopropyl(meth)acrylate, octafluoropentyl (meth)acrylate, heptadecafluorodecyl(meth)acrylate, tribromophenyl(meth)acrylate, methyl α-hydromethyl acrylate, ethyl α-hydromethyl acrylate, propyl α-hydromethyl acrylate, butyl α-hydromethyl acrylate, dicyclopentanyl oxyethyl (meth)acrylate, dicyclopentenyl (meth)acrylate, dicyclopentanyl oxyethyl (meth)acrylate, and dicyclopentenyl oxyethyl (meth)acrylate; aromatic vinyls such as styrene, α-methylstyrene, (o,m,p)-vinyl toluene, (o,m,p)-methoxy styrene, (o,m,p)-chloro styreme, unsaturated ethers such as vinyl methyl ether, vinyl ethyl ether, and allyl glycidyl ether; N-vinyl tertiary amines such as N-vinyl pyrrolidone, N-vinyl carbazole, and N-vinyl morpholine; unsaturated imides such as N-phenyl maleimide, N-(4-chlorophenyl)maleimide, N-(4-hydroxyphenyl)maleimide, and N-cyclohexyl maleimide; anhydrous maleic acids such as anhydrous maleic acid and anhydrous methyl maleic acid; unsaturated glycidyl compounds such as allyl glycidyl ether, glycidyl(meth)acrylate, and 3,4-epoxycyclohexylmethyl(meth)acrylate; a mixture thereof, or the like, but the present invention is not limited thereto.

The ethylenically unsaturated compounds containing the epoxy group may be one or more selected from the group consisting of allyl glycidyl ether, glycidyl (meth)acrylate, 3,4-epoxycyclohexylmethyl (meth)acrylate, glycidyl 5-norbonene-2-methyl-2-carboxylate (endo, exo mixture), 1,2-epoxy-5-hexene, and 1,2-epoxy-9-decene, but the present invention is not limited thereto. The ethylenically unsaturated compounds containing the epoxy group may be contained to be 3 to 40 mol %, preferably, 5 to 30 mol %, of the alkali-soluble polymer compound.

The alkali-soluble polymer compound according to an exemplary embodiment of the present invention can be prepared by mixing the compounds constituting the above repeating units in the corresponding mol ratios, adding a thermal polymerization initiator and a solvent, and reacting them under an inert atmosphere. In this case, any thermal polymerization initiator and any solvent can be used so long as they are used for preparing the conventional alkali-soluble polymer compound.

An acid value of the alkali-soluble polymer compound according to an exemplary embodiment of the present invention may be 30 to 300 KOH mg/g. If the acid value is less than 30 KOH mg/g, developing is not properly made, failing to produce a clean pattern, and if the acid value exceeds 300 KOH mg/g, cleaning characteristics become excessive to cause detachment of the pattern.

The weight average molecular weight of the alkali-soluble polymer compound according to an exemplary embodiment of the present invention ranges from 1,000 to 200,000, preferably, 5,000 to 50,000. If the weight average molecular weight of the alkali-soluble polymer compound is less than 1,000, a stable pattern cannot be obtained and heat resistance deteriorates, and if the weight average molecular weight of the alkali-soluble polymer compound exceeds 200,000, the viscosity of the solution increases overly, making it difficult to perform uniform application.

2. Photosensitive Resin Composition

The photosensitive resin composition according to an exemplary embodiment of the present invention includes: 1) 2 to 20 parts by weight of an alkali-soluble polymer compound including a dehydrogenated pimaric acid and/or its isomer represented by any one of Chemical Formulas 1 to 3 shown above as a repeating unit; 2) 0.5 to 20 parts by weights of a polymerizable compound having ethylenically unsaturated bonds; 3) 0.1 to 20 parts by weight of a radical initiator having optical activity; and 4) 10 to 95 parts by weight of a solvent.

In the photosensitive resin composition, preferably, the content of the 1) alkali-soluble polymer compound is 2 to 20 parts by weight. If the content of the alkali-soluble polymer compound is less than 2 parts by weight, viscosity would be too low to form a thin film and the acid value lowers to make it difficult to perform development. If the content of the alkali-soluble polymer compound exceeds 20 parts by weight, the viscosity increases due to the increase of the polymer components, making it difficult to form a thin film having a desired thickness. The photosensitive resin composition according to an exemplary embodiment of the present invention can be used by using one or more of the alkali-soluble polymer compound.

In the photosensitive resin composition according to an exemplary embodiment of the present invention, 2) the polymerizable compound having ethylenically unsaturated bonds is one or more selected from the group consisting of a compound obtained by esterificating polyhydric alcohol, such as a mixture (M520, TO-2348, and TO-2349 as product names to Dong-a synthesis Co., Ltd., Japan) of an acid variants of ethyleneglycol di(meth)acrylate, polyethyleneglycol di(meth)acrylate having 2 to 14 ethylene groups, trimethylolpropane di(meth)acrylate, trimethylolpropane tri(meth)acrylate, pentaerythritol tri(meth)acrylate, pentaerythritol tetra (meth)acrylate, 2-trisacryloyloxymethylethylphthalic acid, propyleneglycol di(meth)acrylate having 2-14 propylene groups, dipentaerythritol penta(meth)acrylate, dipentaerythritol hexa(meth)acrylate, and dipentaerythritol penta(meth) acrylate, and dipentaerythritol hexa(meth)acrylate, with α,β-unsaturated carboxylic acid; a compound obtained by adding (meth)acrylic acid to a compound containing a glycidyl group such as an trimethylolpropane triglycidyletheracrylic acid addition product, a bisphenol A diglycidyletheracrylic acid addition product, or the like; a compound having a hydroxyl group, such as phthalic acid diester of β-hydroxyethyl(meth) acrylate, toluene diisocyanate addition product of β-hydroxyethyl(meth)acrylate or an ethylenically unsaturated bond, an ester compound with a polyhydric carboxylic acid, or an addition product with polyisocyanate; (meth)acrylate alkylester such as methyl(meth)acrylate, ethyl(meth)acrylate, butyl(meth)acrylate, 2-ethylhexyl(meth)acrylate, or the like; and 9,9'-bis[4-(2-acryloyloxyethoxy)phenyl]fluorine, but the present invention is not limited thereto and those known in the art may be also used. Also, under certain circumstances, a silica dispersion may be used for these compounds. For example, Nanocryl XP series (0596, 1045, 21/1364) of Hanse Chemie Co., and Nanopox XP series (0516, 0525), and the like, may be used as a silica dispersion, but the present invention is not limited thereto.

In the photosensitive resin composition according to an exemplary embodiment of the present invention, preferably, 2) the content of the polymerizable compound having the ethylenically unsaturated bonds may be 0.5 to 20 parts by weight. If the content is less than 0.5 parts by weight, a desired polymerization effect could not be obtained, and if the content exceeds 20 parts by weight, the cleansing characteristics with respect to a develop could deteriorate.

In the photosensitive resin composition according to an exemplary embodiment of the present invention, 3) the radical inidiator having optical activity is at least one or a mixture of two ° wore of the following compounds, for example, triazine-based compound such as 2,4-trichloromethyl-(4'-methoxyphenyl)-6-triazine, 2,4-trichloromethyl-(4'-methoxystyril)-6-trizine, 2,4-trichloromethyl-(fipronil)-6-trizine, 2,4-trichloromethyl-(3',4'-dimethoxyphenyl)-6-trizine, 3-{4-[2,4-bis(trichloromethyl)-s-trizine-6-yl]
phenylthio}propanoic acid, 2,4-trichloromethyl-(4'-ethylbiphenyl)-6-triazine, 2,4-trichloromethyl-(4'-methylphenyl)-6-triazine, or the like; a biimidazole compound such as 2,2'-bis(2-chlorophenyl)-4,4',5,5'-tetraphenyl biimidazole, 2,2'-bis(2,3-dichlorophenyl)-4,4',5,5'-tetraphenylbiimidazole, or the like; an acetophenone-based compound such as 2-hydroxy-2-methyl-1-phenylpropane-1-one, 1-(4-isopropylphenyl)-2-hydroxy-2-methylpropane-1-one, 4-(2-hydroxyethoxy)-phenyl (2-hydroxy)propyl ketone, 1-hydroxycyclohexyl phenyl ketone, 2,2-dimethoxy-2-phenyl acetophenone, 2-methyl-(4-methylthiophenyl)-2-morpholino-1-propane-1-one (Irgacure-907), 2-benzyl-2-dimethylamino-1-(4-morpholinophenyl)-butane-1-one (Irgacure-369); an O-asyloxime-based compound such as Irgacure OXE 01 or Irgacure OXE 02 of Ciba Geigy Ltd.; a benzophenone-based compound such as 4,4'-bis(dimethylamino)benzophenone, 4,4'-bis(diethylamino)benzophenone, or the like; a thioxanthone-based compound such as 2,4-diethyl thioxanthone, 2-chloro thioxanthone, isopropyl thioxanthone, diisopropyl thioxanthone, or the like; a phosphine oxide-based compound such as 2,4,6-trimethylbenzoyldiphenylphosphine oxide, bis(2,6-dimethoxybenzoyl)-2,4,4-trimethylbenzoyl diphenylphosphine oxide, bis(2,6-dimethoxybenzoyl)-2,4,4,-trimethylpentyl phosphine oxide, bis(2,6-dichlorobenzoyl)propyl phosphine oxide, or the like; a coumarin-based compound such as 3,3'-carbonylvinyl-7-(diethylamino)coumarin, 3-(2-benzothiazolyl)-7-(diethylamino)coumarin, 3-benzoyl-7-(diethylamino)coumarin, 3-benzoyl-7-methoxy-coumarin, 10,10'-carbonylbis[1,1,7,7-tetramethyl-2,3,6,7-tetrahydro-1H,5H,11H—C1]-benzopyrano[6,7,8-ij]-quinolizine-11-one, or the like.

In the photosensitive resin composition according to an exemplary embodiment of the present invention, preferably, the content of the 3) radical initiator having optical activity is 0.1 to 20 parts by weight. If the content is less than 0.1 parts by weight, photosensitivity deteriorates, and if the content exceeds 20 parts by weight, the initiator that has remained after reaction to light, would possibly cause a side reaction such as a yellowing phenomenon.

In the photosensitive resin composition according to an exemplary embodiment of the present invention, the 4) solvent may include methylethylketone, methylcellosolve, ethylcellosolve, ethyleneglycol dimethyl ether, ethyleneglycol diethyl ether, propyleneglycol dimethyl ether, propyleneglycol diethyl ether, diethyleneglycol dimethylether, diethyleneglycol diethylether, diethyleneglycol methyl ethyl ether, 2-ethoxy propanol, 2-methoxy propanol, 3-methoxy butanol, cyclohexanone, cyclopentanone, propyleneglycol methyl ether acetate, propyleneglycol ethyl ether acetate, 3-methoxybutyl acetate, ethyl 3-ethoxypropionate, ethyl cellosolveacetate, methyl cellosolveacetate, butyl acetate, dipropyleneglycol monomethyl ether, or a mixture of one or more of them, but the present invention is not limited thereto.

In the photosensitive resin composition according to an exemplary embodiment of the present invention, preferably, the content of the (4) solvent is 10 to 95 parts by weight. If the content is less than 10 parts by weight, the solvent cannot could not sufficiently dissolve all the components, and if the content exceeds 95 parts by weight, the viscosity of the entire solution is lowered to make it impossible to uniformly maintain the thickness in coating.

The photosensitive resin composition according to an exemplary embodiment of the present invention may additionally include one or more of additives such as a hardening accelerator, a thermal polymerization inhibitor, a plasticizer, an adhesion accelerator, a filler, a surfactant, or the like.

As the hardening accelerator, one or more selected from the group consisting of 2-mercaptobenzoimidazole, 2-mercaptobenzothiazole, 2-mercaptobenzoxazole, 2,5-dimercapto-1,3,4-thiadiazole, 2-mercapto-4,6-dimethylaminopyridine, pentaerythritol tetrekis(3-mercaptopropionate), pentaerythritol tris(3-mercaptopropionate), pentaerythritol tetrakis(2-mercaptoacetate), pentaerythritol tris(3-mercaptoacetate), trimethylolpropane tris(2-mercaptoacetate), trimethylolpropane tris(3-mercaptopropionate), trimethylolethane tri(2-mercaptoacetate), and trimethylolethane tris(3-mercaptopropionate) may be used, but the present invention is not limited thereto and those known in the art can be also used.

As the thermal polymerization inhibitor, one or more selected from the group consisting of p-anisole, hydroquinone, pyrocatechol, t-butyl catechol, N-nitrosophenylhydroxyamine ammonium salt, N-nitrosophenylhydroxyamine aluminum salt, and phenothiazine may be used, but the present invention is not limited thereto and those known in the art can be also used.

As the plasticizer, the adhesion accelerator, the filler, the surfactant, and the like, all the compounds which may be used in the prior art photosensitive resin compositions may be used.

In the photosensitive resin composition according to an exemplary embodiment of the present invention, preferably, the content of the additive may be 0.01 to 10 parts by weight. If the content is less than 0.01 parts by weight, a desired effect could be hardly obtained, and if the content exceeds 10 parts by weight, the additive would likely react with other components to make a side reaction.

The photosensitive resin composition according to an exemplary embodiment of the present invention is used for a roll coater, a curtain coater, a spin coater, a slot die coater, various printings, deposition, or the like, and may be applied to supports such as metal, paper, glass plastic substrate, and the like. Also, the photosensitive resin composition according to an exemplary embodiment of the present invention may be applied to a support such as a film, or the like, and then transferred onto another support, or may be applied to a first support, transferred to a blanket, or the like, and then, transferred to a second support, and in this case, the application method is not particularly limited.

As a light source for hardening (or curing) the photosensitive resin composition according to an exemplary embodiment of the present invention, mercury vapor arc, carbon arc, Xe arc, or the like, emitting light having a wavelength of, for example, 250 to 450 nm, may be used, but the present invention is not particularly limited thereto.

The photosensitive resin composition according to an exemplary embodiment of the present invention may be used for photocuring paint, photocuring ink, a transparent photosensitive resin composition for fabricating a thin film transistor (TFT) LCD color filter, a photosensitive resin composition for dispersing pigments, a photosensitive resin composition for forming a black matrix of a TFT LCD or an organic light emitting diode, or the like, and the use for the photosensitive resin composition according to an exemplary embodiment of the present invention is not limited.

In addition, the present invention provides a method for fabricating a transparent thin film layer for an LCD by using the photosensitive resin composition according to an exemplary embodiment of the present invention.

The transparent thin film layer for an LCD may be fabricated through the general fabrication method known in the art, except for using the photosensitive resin composition according to an exemplary embodiment of the present invention.

In addition, the present invention provides a method for fabricating an LCD including the foregoing transparent thin film layer for the LCD.

The LCD may be fabricated through the general fabrication method known in the art, except that it includes the transparent thin film layer for an LCD fabricated by using the photosensitive resin composition according to an exemplary embodiment of the present invention.

The photosensitive resin composition according to an exemplary embodiment of the present invention uses a polymer compound (i.e., a highly polymerized compound or a high molecular compound) comprising dehydrogenated resin acid as an effective binder matrix material, thus improving the sensitivity of the photosensitive resin composition, and the developing characteristics, reducing the degree of deformation of a pattern in the process of a thermal treatment, and having excellent elasticity, and as such, the photosensitive resin composition can be advantageous for curing the material of column spacers, an overcoat, a passivation layer of an LCD and reduce a defective rate during the manufacturing process.

The present invention will now be described in detail through embodiments hereinafter. The following embodiments are merely illustrative, without limiting the scope of the present invention. Also, only particular examples are shown in the following embodiments, but it would be obvious for a skilled person in the art that their equivalents may be used to obtain similar effects.

<Preparation of Alkali-Soluble Polymer Compound>

SYNTHESIS EXAMPLE 1

A binder polymer containing dehydrogenated pimaric acid represented by Chemical Formula 1 as above as dehydrogenated resin acid was synthesized in the following manner. 3 parts by weight of V-65 was dissolved as a thermal initiator in a solvent in a reaction container, into which 10 mol % of pimaric acid, 20 mol % of (meth)acrylic acid, and 70 mol % of benzyl methacrylate were put. The resultant material was reacted for 12 hours at 60° C. under a nitrogen atmosphere. Mol content rates of the obtained alkali-soluble polymer compound were 10%, 20%, and 70%, respectively, like those at the time when they were put in the solvent. An acid value of the alkali-soluble polymer compound was 98 KOH mg/g and a weight average molecular weight (Mw) was 25,000.

SYNTHESIS EXAMPLE 2

An alkali-soluble polymer compound was synthesized in the same manner as that of Synthesis Example 1, except that isopimaric acid represented by Chemical Formula 2 as above was used as dehydrogenated resin acid. An acid value of the alkali-soluble polymer compound obtained through Synthesis Example 2 was 98 KOH mg/g and a weight average molecular weight (Mw) was 25,300.

SYNTHESIS EXAMPLE 3

An alkali-soluble polymer compound was synthesized in the same manner as that of Synthesis Example 1, except that sandaracopimaric acid represented by Chemical Formula 3 as above was used as dehydrogenated resin acid. An acid value of the alkali-soluble polymer compound obtained through Synthesis Example 3 was 98 KOH mg/g and a weight average molecular weight (Mw) was 24,800.

SYNTHESIS EXAMPLE 4

An alkali-soluble polymer compound was synthesized in the same manner as that of Synthesis Example 1, except that 6 parts by weight of V-65 was dissolved in the solvent in the reaction container. An acid value of the alkali-soluble polymer compound obtained through Synthesis Example 4 was 98 KOH mg/g and a weight average molecular weight (Mw) was 6,800.

SYNTHESIS EXAMPLE 5

An alkali-soluble polymer compound was synthesized in the same manner as that of Synthesis Example 1, except that 2 parts by weight of V-65 was dissolved in the solvent, into which 10 mol % of pimaric acid, 20 mol % of (meth)acrylic acid, and 70 mol % of benzyl methacrylate were put, and the resultant material was reacted 12 hours at 75° C. under a nitrogen atmosphere. An acid value of the alkali-soluble polymer compound obtained through Synthesis Example 5 was 98 KOH mg/g and a weight average molecular weight (Mw) was 115,000.

SYNTHESIS EXAMPLE 6

An alkali-soluble polymer compound was synthesized in the same manner as that of Synthesis Example 1, except that 5 mol % of pimaric acid, 5 mol % of (meth)acrylic acid, and 90 mol % of benzyl methacrylate were put. An acid value of the alkali-soluble polymer compound obtained through Synthesis Example 6 was 31 KOH mg/g and a weight average molecular weight (Mw) was 21,000.

SYNTHESIS EXAMPLE 7

An alkali-soluble polymer compound was synthesized in the same manner as that of Synthesis Example 1, except that 50 mol % of pimaric acid, 20 mol % of (meth)acrylic acid, and 30 mol % of benzyl methacrylate were put. An acid value of the alkali-soluble polymer compound obtained through Synthesis Example 7 was 117 KOH mg/g and a weight average molecular weight (Mw) was 26,000.

COMPARATIVE SYNTHESIS EXAMPLE 1

An alkali-soluble polymer compound was synthesized in the same manner as that of Synthesis Example 1, except that 20 mol % of methacrylic acid and 80% of benzyl methacylate, without dehydrogenated resin acid, were put and copolymerized. An acid value of the alkali-soluble polymer compound obtained through Comparative Synthesis Example 1 was 65 KOH mg/g and a weight average molecular weight (Mw) was 24,000.

<Preparation of Photosensitive Resin Composition>

Embodiment 1

A photosensitive resin composition was prepared by mixing 8 parts by weight of alkali-soluble polymer compound prepared in Synthesis Example 1, 16 parts by weight of dipentaerythritol hexacrylate, i.e., a polymerizable compound having ethylenically unsaturated bonds, 1 weight part of 2-benzyl-2-dimethylamino-1-(4-morpholinophenol)-butane-1-one (Product name: Irgacure-369, Ciba Geigy Ltd.) as a photo polymerization initiator, and 75 parts by weight of propylene glycol monomethyl ether acetate (PGMEA) as an organic solvent for three hours by using a shaker The mixed photosensitive solution was filtered by using a filter having a size of 5-microns, which was then spin-coated on glass and pre-heated at 100° C. for two minutes to form an even film having a thickness of about 2.5 µm. The film was exposed under a high pressure mercury lamp by using a circular isolated pattern type photomask having a diameter of 30 µm, and thereafter, the resultant pattern was developed with KOH alkali aqueous solution having 11.3 to 11.7 pH and then cleansed with deionized water. The resultant pattern was post-heated at 200° C. for 40 minutes, and the state of the pattern was observed with an optical microscope and a pattern profiler.

Embodiment 2

A photosensitive resin composition was prepared in the same manner as that of Embodiment 1, except that the alkali-soluble polymer compound synthesized in Synthesis Example 2, instead of the alkali-soluble polymer compound synthesized in Synthesis Example 1, was used.

Embodiment 3

A photosensitive resin composition was prepared in the same manner as that of Embodiment 1, except that the alkali-soluble polymer compound synthesized in Synthesis Example 3, instead of the alkali-soluble polymer compound synthesized in Synthesis Example 1, was used.

Embodiment 4

A photosensitive resin composition was prepared in the same manner as that of Embodiment 1, except that the alkali-soluble polymer compound synthesized in Synthesis Example 4, instead of the alkali-soluble polymer compound synthesized in Synthesis Example 1, was used.

Embodiment 5

A photosensitive resin composition was prepared in the same manner as that of Embodiment 1, except that the alkali-soluble polymer compound synthesized in Synthesis Example 5, instead of the alkali-soluble polymer compound synthesized in Synthesis Example 1, was used.

Embodiment 6

A photosensitive resin composition was prepared in the same manner as that of Embodiment 1, except that the alkali-soluble polymer compound synthesized in Synthesis Example 6, instead of the alkali-soluble polymer compound synthesized in Synthesis Example 1, was used.

Embodiment 7

A photosensitive resin composition was prepared in the same manner as that of Embodiment 1, except that the alkali-soluble polymer compound synthesized in Synthesis Example 7, instead of the alkali-soluble polymer compound synthesized in Synthesis Example 1, was used.

COMPARATIVE EXAMPLE 1

A photosensitive resin composition was prepared in the same manner as that of Embodiment 1, except that the alkali-soluble polymer compound synthesized in Comparative Synthesis Example 1, instead of the alkali-soluble polymer compound synthesized in Synthesis Example 1, was used.

<Evaluation of Physical Properties of the Transparent Photosensitive Compositions>

Physical properties of the transparent photosensitive resin compositions prepared in Embodiments and Comparative Example were measured, and the results were organized as shown in Table 1 below.

(1) Photosensitivity

The amount of exposure when thickness is not increased any further by using a circular isolated pattern type photomask having a diameter of 30 μM was defined as sensitivity, and the sensitivity was measured while changing the amount of exposure. It can be considered that the sensitivity becomes excellent as the amount of exposure is reduced. Light of the entire wavelength regions emitting from a high pressure mercury lamp as a light source was used without a filter with respect to a particular wavelength, and the amount of exposure was measured at 365 nm (I line).

(2) Developing Characteristics

Roughness of a bottom surface of a glass substrate around the pattern was measured by using an atomic force spectroscopy. For accuracy of the roughness value, a regular quadrilateral region having 500 nm each in width and length was measured. As the degree of roughness is reduced, the developing characteristics are excellent.

(3) Deformation Caused by the Firing Process

An upper diameter (measured based on the diameter at a point where the thickness was 95%) of each of the patterns created through the composition Embodiments and Comparative Example was measured before and after a thermal treatment (200° C., 40 minutes) and compared. As the difference in the diameter before and after the thermal treatment is smaller, the degree of thermal deformation is reduced.

(4) Elasticity

The degrees of elasticity of the patterns created through the composition Embodiments and Comparative Example were compared based on an elasticity restoration rate, i.e., a ratio between a maximum deformation amount and restored deformation amount when a force is removed after pressing the patterns up to 1N by using a flat tip (Fischerscope H100©). As the numerical value is high, the elasticity is excellent.

TABLE 1

| | | Photosensitivity (Mj/cm²) | Developing characteristics Roughness (nm) | Deformation caused by firing process | | | Elasticity Elasticity restoration rate (%) |
| --- | --- | --- | --- | --- | --- | --- | --- |
| | | | | Upper diameter of pattern before thermal treatment | Upper diameter of pattern after thermal treatment | Difference in upper diameter (micro) | |
| Embodiment 1 | Synthesis Example 1 | 155 | 21 | 32 | 31 | 1 | 92 |
| Embodiment 2 | Synthesis Example 2 | 155 | 18 | 34 | 32 | 2 | 94 |
| Embodiment 3 | Synthesis Example 3 | 150 | 22 | 33 | 30 | 3 | 91 |
| Embodiment 4 | Synthesis Example 4 | 180 | 19 | 30 | 29 | 1 | 90 |
| Embodiment 5 | Synthesis Example 5 | 130 | 36 | 37 | 35 | 2 | 97 |
| Embodiment 6 | Synthesis Example 6 | 110 | 74 | 34 | 34 | 0 | 96 |
| Embodiment 7 | Synthesis Example 7 | 150 | 13 | 29 | 29 | 0 | 91 |
| Comparative Example 1 | Comparative Synthesis Example 1 | 210 | 92 | 36 | 28 | 8 | 88 |

As shown in the results of Table 1, it is noted that, since the alkali-soluble polymer compound including dehydrogenated pimaric acid and its isomer as repeating unit is used as a binder matrix material, the sensitivity of the photosensitive resin composition is excellent, the developing characteristics are improved, the degree of deformation of the pattern in the process of a thermal treatment is restrained to be as small as 5 μm, and the elasticity is improved to be 90% or greater.

In comparison, it is noted that, when the alkali-soluble polymer compound having the conventional structure, without dehydrogenated pimaric acid and its isomer, is included as a binder matrix material, the photosensitivity and developing characteristics are not sufficient, and in particular, the thermal deformation in the firing process is severe.

As a result, since the particular structure is satisfied in the alkali-soluble polymer compound according to the present invention, an excellent thin film can be formed in the entire process of forming the pattern, and it can be confirmed that the physical properties of the thusly fabricated thin film are excellent.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A negative-type photosensitive resin composition comprising:
   1) 2 to 20 parts by weight of the alkali-soluble polymer compound including a dehydrogenated pimaric acid and/or its isomer represented by any one of Chemical Formulas 1 to 3 shown below as a repeating unit, a monomer containing an acid functional group, and a monomer copolymerizable with a monomer containing an acid functional group;

[Compound Formula 1]
   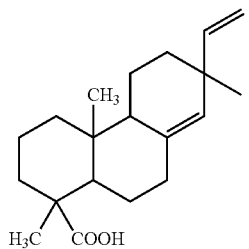

[Compound Formula 2]
   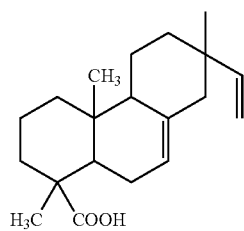

[Compound Formula 3]
   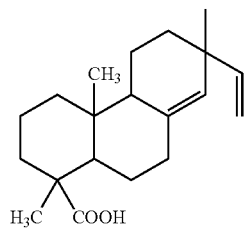

2) 0.5 to 20 parts by weight of a polymerizable compound having ethylenically unsaturated bonds;
   3) 0.1 to 20 parts by weight of an optically active radical initiator; and
   4) 10 to 95 parts by weight of a solvent.

2. The composition of claim 1, wherein the 2) polymerizable compound having ethylenically unsaturated bonds is one or more selected from the group consisting of a compound obtained by esterificating polyhydric alcohol with α, β-unsaturated carboxylic acid; a compound obtained by adding (meth)acrylic acid to a compound containing a glycidyl group; an addition product with a compound having a hydroxyl group or an ethylenically unsaturated bond and an ester compound with polyhydric carboxylic acid, or with polyisocynate; (meth)acrylic acid alkylester; and 9,9'-bis[4(2-acryloyloxyethoxy)phenyl]fluorine.

3. The composition of claim 1, wherein the 3) optically active radical initiator may be a mixture of one or two or more selected from the group consisting of triazine-based compound, a biimiazole-based compound, an acetophenone-based compound, an O-asyloxime-based compound, a benzophenone-based compound, thioxantone-based compound, a phosphine oxide-based compound, and a coumarin-based compound.

4. The composition of claim 1, wherein the 4) solvent is selected from the group consisting of methylethylketone, methylcellosolve, ethylcellosolve, ethyleneglycol dimethyl ether, ethyleneglycol diethyl ether, propyleneglycol dimethyl ether, propyleneglycol diethyl ether, diethyleneglycol dimethylether, diethyleneglycol diethylether, diethyleneglycol methyl ethyl ether, 2-ethoxy propanol, 2-methoxy propanol, 3-methoxy butanol, cyclohexanone, cyclopentanone, propyleneglycol methyl ether acetate, propyleneglycol ethyl ether acetate, 3-methoxybutyl acetate, ethyl 3-ethoxypropionate, ethyl cellosolveacetate, methyl cellosolveacetate, butyl acetate, dipropyleneglycol monomethyl ether, and a mixture of one or more of them.

5. The composition of claim 1, wherein the photosensitive resin composition further comprises one or more selected from the group consisting of a hardening accelerator, a thermal polymerization inhibitor, a plasticizer, an adhesion accelerator, a filler, and a surfactant.

6. A transparent thin film layer using the photosensitive resin composition according to claim 1.

7. A liquid crystal display (LCD) device comprising the transparent thin film layer using the photosensitive resin composition according to claim 1.

8. The composition of claim 1, wherein an acid value of the alkali-soluble polymer compound is 30 to 300 KOH mg/g.

9. The composition of claim 1, wherein a weight average molecular weight of the alkali-soluble polymer compound ranges from 1,000 to 200,000.

10. The composition of claim 1, wherein the dehydrogenated pimaric acid and/or its isomer represented by any one of Chemical Formulas 1 to 3 is contained to be within the range of 3 to 50 mol % of the alkali-soluble polymer compound.

11. The composition of claim 1, wherein the alkali-soluble polymer compound comprises an ethylenically unsaturated compound selectively comprising an epoxy group.

12. The composition of claim 1, wherein the monomer containing an acid functional group is one or more selected from the group consisting of (meth)acrylic acid, crotonic acid, itaconic acid, maleic acid, fumaric acid, monomethyl maleic acid, isoprene sulfonic acid, styrene sulfonic acid, 5-norbornene-2-carboxylic acid, mono-2-((meth)acryloyloxy)ethyl phthalate, mono-2-((meth)acryloyloxy)ethyl succinate, ω-carboxy polycaprolactone mono(meth)acrylate, and a mixture thereof.

13. The composition of claim 1, wherein the monomer which can be polymerizable with the monomer containing an acid functional group may be one or more selected from the group consisting of unsaturated carboxylic acid esters, aromatic vinyls, unsaturated ethers, N-vinyl tertiary amines, unsaturated imides, anhydrous maleic acids, unsaturated glycidyl compounds, and a mixture thereof.

14. The composition of claim 11, wherein the ethylenically unsaturated compound selectively containing an epoxy group may be one or more selected from the group consisting of allyl glycidyl ether, glycidyl(meth)acrylate, 3,4-epoxycyclohexylmethyl(meth)acrylate, glycidyl 5-nobonene-2-methyl-2-carboxylate (endo, exo mixture), 1,2-epoxy-5-hexene, and 1,2-epoxy-9-decene.

* * * * *